Aug. 15, 1961   R. T. CASEBOLT   2,996,159
MITER JOINT
Filed June 2, 1958

INVENTOR
Ralph T. Casebolt
BY
Townsend and Townsend
attorneys

United States Patent Office

2,996,159
Patented Aug. 15, 1961

2,996,159
MITER JOINT
Ralph T. Casebolt, 4301 Bermuda Ave., Oakland, Calif.
Filed June 2, 1958, Ser. No. 739,161
9 Claims. (Cl. 189—36)

This invention describes new and useful improvements in miter joints and particularly teaches a mechanism adapted to miter extruded metal shapes or the like defining an interiorly extending channel.

Prior to this invention there has been no satisfactory, practicable means whereby extruded metal shapes may be easily and effectively mitered to form a substantially perfect mitered joint. A particular problem has ordinarily been that abutting, angularly cut ends of the mitered shapes would diverge from the defined inner apex of the miter joint to the outer apex leaving a gap at the latter.

A foremost object of the present invention is to provide a simple device effective to form and maintain a substantially perfect mitered joint in structural shapes of the type described formed with interiorly extending channels.

A further object of the invention is to provide the joining device with serrations which engage opposed interior faces of the defined channels of the joined or mitered shapes to lock the shapes in mitered position.

The device is of simple construction lending itself both to economy of manufacture and simplicity of use.

The foregoing and other objects of the invention will be appreciated upon a reading of the following written description and an understanding of the accompanying drawings wherein.

The drawings illustrate a joint A joining or mitering a pair of complementarily formed channel-like shapes B and spreading means C operable to spread or expand each pair of arms of the joining member.

Figure 2:
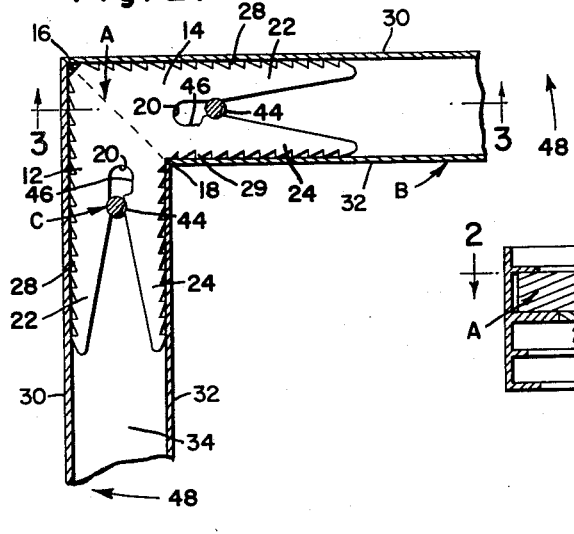
FIG. 2 is a plan view of the mitered members of FIG. 1, shown partially in cross section taken substantially on line 2—2 of FIG. 3.
Figure 3:
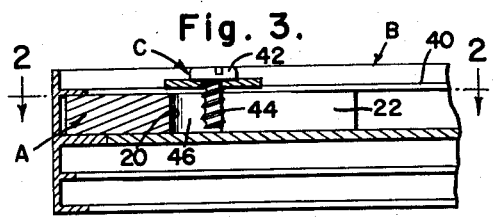
FIG. 3 is a side elevation in cross section taken substantially on line 3—3 of FIG. 2.

As particularly appears in FIG. 2, joint A comprises a pair of legs 12 and 14 joined together or formed integral at their ends to form in the drawings a right angle defining an outer apex 16 and an inner apex 18.

Legs 12 and 14 are each bifurcated as at 20 from a point substantially aligned with inner apex 18 extending to the spaced ends of each leg to each define a pair of bifurcated legs or arms 22 and 24.

The perimeter of joint A has been formed with a plurality of serrations 28 inclined in the direction of associated apices 16 or 18.

Figure 4:
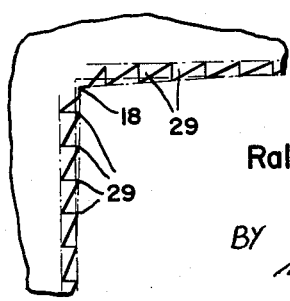
FIG. 4 is a fragmentary view of the inner apex of the joining device illustrating the increased length of serrations adjacent the inner apex.

As particularly appears in FIG. 4, serrations adjacent inner apex 18 indicated at 29 have been progressively increased in length as they approach the inner apex whereby the angle defined at the inner apex is slightly greater than the angle at outer apex 16.

Extruded metal shapes B have been illustrated as of a generally H section comprising two walls 30 and 32 joined by a web 34 and defining in the drawings an upper or joint receiving channel 36 and a lower channel 38. The lower channel is a structural aid for building purposes and has no specific relation to the present invention.

Upper channels 36 are dimensioned to slidably but snugly receive a bifurcated leg 12 or 14 between their opposed interior walls. A short flange 40 projects interiorly from the opposed walls a short distance above web 34. Flanges 40 serve to guide and retain the legs of joint A within upper channel 36 of the extruded shapes B.

The spreading means C for spreading or expanding arms 22 and 24 have been illustrated as a self-threading screw 42 inserted between each pair of arms. The opposed edges of arms 22 and 24 are threaded proximate the point of bifurcation 20 as at 44 to receive self-threading screw 42. On threading screw 42 into threads 44 arm 22 and 24 are forced apart against the opposed interior faces of channel 36.

The drawings illustrate the head of screws 42 as separated from threads 44 by a square washer 50 spanning flanges 40. Washers 50 tend to given additional rigidity to the assembled joint. In addition it will be noted that flanges 40 are lowered relative to the top edge of walls 30 and 32 thereby effecting a countersinking of screw 42 whereby the top of the screw is flush wtih the top of walls 30 and 32.

Inner arms 24 extending from inner apex 18 have been weakened relative to outer arms 22 whereby the inner arms offer less resistance to expansion than the outer arms. In the drawings, weakening of inner arms 24 has been effected by forming the inner arms with a cutout 46 between the point of bifurcation 20 and threads 44 whereby the width and accordingly strength of inner arms 24 is less than that of arms 22 at this point.

In use, it will be appreciated extruded metal shapes B should initially be complementarily cut or beveled at the ends to be joined to form a mitered joint.

Figure 1:
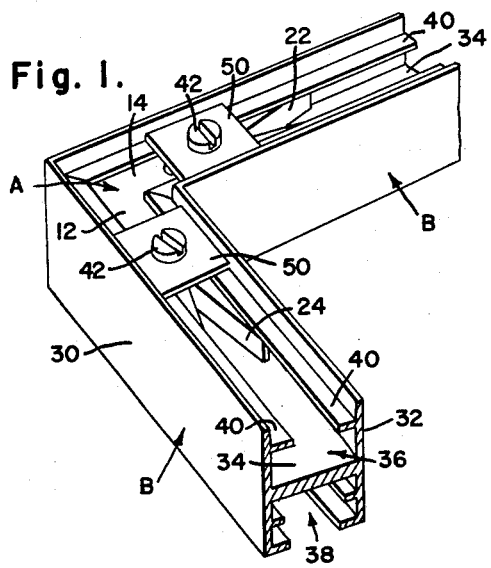
FIG. 1 is a perspective view of a pair of extruded metal shapes or the like mitered according to the present invention.

Legs 12 and 14 are then each inserted in a channel 36 of a metal shape B, and joint A and shapes B positioned with the angularly formed ends of shapes B juxtaposed as in FIGS. 1 and 2. A self-threading screw 42 is then inserted in thread 44 of each leg and screwed in between the legs. As screws 42 are screwed in arms 22 and 24 are forced apart. This results in an initial or primary expansion of inner arms 24 relative to arms 22 forcing raised serrations 29 against opposed walls 32 of chanels 36.

Outer arms 22 are correspondingly forced against opposed walls 30 of channels 36. This moves shapes B relatively outwardly as indicated by arrows 48 in FIG. 2 and causes shapes B to tend to rotate very slightly about raised serrations 29 at inner apex 18 forcing the complementarily mitered ends of shapes B and particularly the outer portions thereof adjacent outer apex 16 into wedged juxtaposition to effect a tight and substantially perfect mitered joint.

Serrations 28 along the perimeter of joint A as well as raised serrations 29 tend to imbed themselves in the walls of channel 36 serving to lock shapes B in mitered position and also as a result of the inclination of the serrations toward the apices tending to further force the shapes into mitered juxtaposition.

Figure 5:
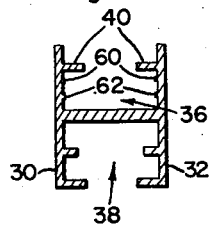
FIG. 5 is a cross section of a modified form of extruded metal shape.

FIG. 5 illustrates a modified form of extruded metal shape wherein parts identical to the shapes of FIGS. 1–4 are given the same numeral designation. The embodiment of FIG. 5 differs in the addition of two protrusions 60 and 62 extending longitudinally of the interior faces of walls 30 and 32 within the defined upper channel 36.

In use serrations 28 and 29 of arms 22 and 24 tend to engage and embed in the protrusions upon expansion of the arms, to constitute a rigid locking of the joined shapes.

The invention thus provides a simple device to form and maintain a substantially perfect mitered joint and lends itself admirably both to economy of manufacture and simplicity of use.

Although the foregoing invention has been described in some detail for purposes of clarity of illustration it will be appreciated certain changes and modifications may be practiced without departing from the spirit of the invention as limited only by the scope of the appended claims.

What is claimed is:

1. A joint defining an outer apex and an inner apex and comprising two angularly disposed pairs of arms, each pair of arms including a first leg extending from said outer apex and a second arm extending from said inner apex, means mountable between each pair of arms for spreading the arms of each said pair relatively away from each other, said second arms being weakened relative to said first arms whereby said second arms offer less resistance to spreading movement than said first arms, said second arms being enlarged adjacent said inner apex in the plane of the defined angle.

2. A joint for mitering a pair of extruded metal shapes defining interiorly extending channels comprising two legs defining a right angle having an outer apex and an inner apex, each said leg being bifurcated to each define first and second arms, said first arms extending from said outer apex and said second arms extending from said inner apex, each pair of arms being individually expandable whereby the arms of each pair are expandable relatively away from each other in the plane of the defined angle, means positionable between said arms to expand said arms, said second arms being weakened relative to said first arms whereby said second arms offer less resistance to expanion than said first arms, said outer apex defining an angle of substantially 90° and said inner apex defining an angle of slightly greater than 90° whereby upon insertion of each pair of arms into the defined channel of an extruded metal shape and expansion of said arms therein said first arms will move said shape to juxtapose and miter the portions of said shapes adjacent said outer apex.

3. The combination of claim 2 wherein the edges of said arms are formed with serrations extending in the plane of the defined apexes to engage the walls of said defined channels to lock said shapes in position and wherein individual serrations on the edges of each arm are inclined toward the apex from which said arm extends.

4. A miter joint for connecting metal shapes having interiorly formed channels comprising a right angle member having two legs formed of metal and provided with serrations formed on the side walls of said member to contact side walls of said channels, the innermost serrations on the inside side wall of the member being progressively of less depth from the point of joinder of the two legs toward the ends of the legs, said leg being bifurcated to form two spaced arms, and means to spread the bifurcated arms of said member against said channel walls and make and maintain a tight joinder between the meeting faces of the joined metal shapes.

5. In a device of the type described the combination including a joint comprising rigid angularly disposed legs defining an outer apex and an inner apex, said inner apex defining a greater angle than said outer apex, each said leg being bifurcated to be expandable in the plane of the defined apices, the perimeter of said joint being formed with a plurality of serrations, means to expand the bifurcated portions of each said leg, a pair of extruded metal shapes defining interiorly extending channels, each said channel being adapted to receive a leg of said joint between opposed walls of said channel, and at least one protrusion extending longitudinally of each said opposed wall and positioned to engage said serrations on expansion of said bifurcated legs.

6. A device for joining mitered channeled strips comprising: two members disposed angularly to one another; each said member being bifurcated to form an inside and outside arm and arranged to snugly engage the channel walls of said strips; said member disposed at an angle substantially equal to the angle between the mitered channel strips to be joined, the outside face of the inside arms formed at a slightly greater angle in respect to one another than are the outside faces of said outside arms in respect to one another; and means engageable with the inside faces of said legs to spread said arms relative to one another; said inside arms being formed to be moved toward one another by said spreader means and said outside arms formed to resist spreading movement.

7. The device of claim 6 and wherein the outside faces of both arms are formed with serrations formed to functionally engage the walls of the channels of said strips to prevent relative sliding movement between said strips and said arms.

8. The device of claim 6 and wherein said inside arms are formed to be moved by being structurally weakened proximate the point of bifurcation.

9. In a joint for mitering a pair of extruded metal shapes defining interiorly extending channels the combination including: first angularly disposed arms defining an outer apex and second angularly disposed arms defining an inner apex; said inner apex defining a greater angle than said outer apex; said first and second arms being joined together to be expandable in the plane of the defining apexes; the perimeter of said joint being formed with a plurality of serrations extending in the plane of the defined apexes; and means to expand the bifurcated portions of each said arm; said second arm being formed to be substantially less resistant to movement in the plane of the defined apex than said first arm.

References Cited in the file of this patent

UNITED STATES PATENTS

| | | |
|---|---|---|
| 642,558 | Oldenbusch | Jan. 30, 1900 |
| 2,101,349 | Sharp | Dec. 7, 1937 |
| 2,188,209 | Sharp | Jan. 23, 1940 |
| 2,857,635 | Maple et al. | Oct. 28, 1958 |

FOREIGN PATENTS

| | | |
|---|---|---|
| 250,299 | Switzerland | June 16, 1948 |